United States Patent
Steffan et al.

[11] Patent Number: 5,905,434
[45] Date of Patent: May 18, 1999

[54] VEHICLE COMMUNICATION DEVICE

[76] Inventors: Paul J. Steffan, 5710 Castleford Way, Elk Grove, Calif. 95758; Ming Chun Chen, 205 San Marino, Irvine, Calif. 92614

[21] Appl. No.: 08/987,253

[22] Filed: Dec. 8, 1997

[51] Int. Cl.$^6$ ..................................................... B60Q 1/50
[52] U.S. Cl. ......................... 340/464; 340/468; 340/475; 340/479; 116/28 R; 116/42
[58] Field of Search ................................. 340/464, 468, 340/471, 472, 479, 469, 478, 475, 463, 465, 470, 473, 815.6, 815.53; 116/28 R, 42

[56] References Cited

U.S. PATENT DOCUMENTS

| | | | |
|---|---|---|---|
| 3,750,138 | 7/1973 | Burgan et al. | 340/468 |
| 4,361,828 | 11/1982 | Hose | 340/107 |
| 4,431,984 | 2/1984 | Bileck | 340/107 |
| 4,574,269 | 3/1986 | Miller | 340/97 |
| 4,631,516 | 12/1986 | Clinker | 340/76 |
| 4,868,542 | 9/1989 | Thompson | 340/468 |
| 4,868,719 | 9/1989 | Kouchi et al. | 362/61 |
| 4,928,084 | 5/1990 | Reiser | 340/479 |
| 4,949,071 | 8/1990 | Hutchison | 340/468 |
| 5,053,746 | 10/1991 | Taneo | 340/473 |
| 5,132,666 | 7/1992 | Fahs | 340/468 |
| 5,426,414 | 6/1995 | Flatin et al. | 340/472 |
| 5,500,638 | 3/1996 | George | 340/468 |
| 5,574,428 | 11/1996 | Groover | 340/468 |

*Primary Examiner*—Nina Tong
*Attorney, Agent, or Firm*—H. Donald Nelson

[57] ABSTRACT

A vehicle communications system having a remote control unit installed in the interior of a vehicle and a display unit located on the exterior of the vehicle. The display unit has an input from the remote control unit and an input from a vehicle interface module that has inputs from the vehicle such as the braking system and the turning signal system. The remote control unit is controllable by the driver in the vehicle and has a table of preset and preprogrammed messages selectable by the driver. The driver selects a message to be displayed and sends the message to the display unit. Any input to the vehicle interface module from the vehicle signaling systems overrides the signal input from the remote control unit unless the display unit is mounted on the front of the vehicle. The driver can select a message from a table of messages that are sequentially displayed on the remote control unit. The table of messages is stored on a flash memory in the remote unit and in a flash memory in the display unit. The table of messages in the remote unit is programmable via a USB programming port. The table of messages in the display unit can be programmed via an RF signal sent to the display unit by the remote unit.

12 Claims, 4 Drawing Sheets

VEHICLE COMMUNICATION DEVICE

BACKGROUND OF THE INVENTION

1. Field of the Invention

This invention relates generally to a communication system installed in and on a vehicle to communicate to pedestrians or drivers of other vehicles. More specifically this invention relates to a communication system installed in and on a vehicle to communicate information concerning the operation of the vehicle or to communicate information concerning conditions the drivers of other vehicles will encounter. The invention also relates to a communication system installed in and on a vehicle to communicate various other types of information to other drivers and pedestrians such as commercial messages, safety messages and good cheer messages.

2. Discussion of the Related Art

In many countries there is an increasing number of automobiles and other types of motor vehicles, such as trucks, vans and delivery vehicles that are crowded onto increasingly crowded roadways. There are basically two types of situations encountered by modern vehicles, first there is the high speed travel encountered on toll roads, freeways or interstate highways and second, there is the congested, crowded travel encountered mainly in cities and suburban areas. In either situation, it is becoming more and more important to increase the safety of travel to improve the quality of travel for all travelers.

Because of the high-speed travel encountered in the first situation and the congested and crowded travel encountered in the second situation it is important that as much information as possible concerning operation of a vehicle be communicated to other vehicles. In addition, it is important that as much information as possible be communicated to following vehicles concerning conditions the following vehicles will encounter. This information must be communicated quickly and easily and be clear and concise.

There is a need to enhance public safety by communicating safety messages or warning messages to others quickly and effectively. For example, police cars may need to communicate messages such as "STAY IN YOUR CAR", or "PULL OVER". An ambulance may need to communicate messages to others concerning safety and dangerous situations.

There is a need to enhance commercial messages in an unobtrusive method, including being able to send an advertising message including a logo.

The standard vehicle communication devices are well known in the art and include signals that indicate what the vehicle driver is doing or is going to do, such as braking signals, turning signals, and car-in-reverse signals. There are other signals such as hazard signals that indicate that there is an unsafe condition that is being encountered. Some of these signals occur without a separate action of the driver, such as the brake signals come on whenever the driver steps on the brake pedal and the car-in-reverse signals come on whenever the driver places the car in reverse. Others signals require a separate action of the driver, such as moving the turn signal lever or by pressing a hazard signal lever or button.

Various systems for automobile-to-automobile communication have been proposed. Generally, these involve the signaling of preselected messages from one vehicle to another in response to the manual operation of a switch to select the message to be communicated. These systems typically do not interface with the standard vehicle signaling devices. Other simple communicating devices include fixed signals with appropriate messages that are displayed somewhere on the vehicle. Some of the proposed methods include messages that are pre-programmable to be displayed at the rear of the vehicle. However, one of the problems in existing systems is that when these fixed signals are displayed there is a potential for confusing signals to be sent. There can be conflicting signals sent by the communications system to the drivers of other vehicles when the automatic signals are displayed, such as break lights or turn signals. For example, the driver of a vehicle may be displaying a fixed sign such as "SAFE TO PASS ON RIGHT", when an emergency braking situation occurs. The driver presses the break pedal and does not have time to remove the displayed fixed sign. This situation clearly has the potential to confuse a following driver and may cause an accident.

The existing systems, as well as proposed systems, do not have the capability to be reprogrammed by the user of the vehicle.

Therefore, what is needed is a communication system that increases the amount of information that is communicated to other drivers, avoid confusing signals being communicated to the other drivers and be rapidly and easily reprogrammed with new messages selectable by the user.

SUMMARY OF THE INVENTION

A vehicle communication system in accordance with the present invention solves the above and other problems associated with conventional vehicle communications systems with a vehicle communications system that can be adapted to serve various needs of the owners of vehicles. The various needs include business requirements such as advertisement, the requirements of police departments who could display safety or warning messages such as "STAY IN VEHICLE", "PULL OVER", and professional needs such as Taxi owners who could display messages such as "IN SERVICE" and "OUT OF SERVICE".

The present invention is directed to a vehicle communication system that has a remote control unit, a display unit, and a vehicle interface module. The remote control unit is installed in the vehicle and is controllable by a person in the vehicle. The display unit can be installed on various locations on the vehicle. The display unit has input from the remote control unit and input from the vehicle interface module. The vehicle interface module has inputs from signal systems in the vehicle, such as the braking light system, the turn signal system, the hazard light system, the vehicle security system and the vehicle-in-reverse signal system. All of the various messages can be assigned a priority that controls which message will be displayed when there are two or more inputs. When the display unit is located on the rear of vehicle, the input from the vehicle interface module can be assigned a priority so that it overrides the input from the remote control unit. When the display unit is located on the front of the vehicle, the input from the vehicle interface module can be assigned a priority so that it does not override the input from the remote control unit. In addition, when the display unit is located on the front of the vehicle, the character pattern can be reversed so that a driver in a vehicle in front of the vehicle with the display can read the message when looking in a rear view mirror.

The remote control unit has a memory unit with a table of preselected and programmed messages, a rotary switch to scroll through the messages, and a switch to select the desired message. When the driver selects the message, the remote control unit sends an encoded message to the display unit. When the display unit receives the encoded message, it decodes the message and a pattern-generating module in the display unit sends the pattern to an array power distribution module. The array power distribution module amplifies the signals so that high luminescence LEDs or lights can be bright enough to be seen in daylight conditions as well as nighttime conditions.

Each input signal from the vehicle to the vehicle interface module and remote control unit is assigned a priority. This is done so that in the event two or more signals are input to the vehicle interface module at the same time, the pattern-generating module will send the message with the highest priority to the array power distribution module.

The table of preselected and programmed signals is stored in a flash memory in the remote control unit and in a flash memory in the display unit. The table of preselected and programmed signals in the remote control unit can be reprogrammed via a USB programming port located on the remote control unit by a computer such as a hand held computer. The flash memory in the display unit can be programmed via an RF signal transmitted from the remote control unit and received by the display unit. In addition, the flash memory in the display unit can be programmed via a USB programming port located on the display unit.

The present invention is better understood upon consideration of the detailed description below, in conjunction with the accompanying drawings. As will become readily apparent to those skilled in the art from the following description, there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiments when read in conjunction with the accompanying drawings, wherein:

DETAILED DESCRIPTION

Reference is now made in detail to specific embodiments of the present invention that illustrate the best mode presently contemplated by the inventors for practicing the invention. In the following figures, like numerals indicate like elements.

Figure 1:
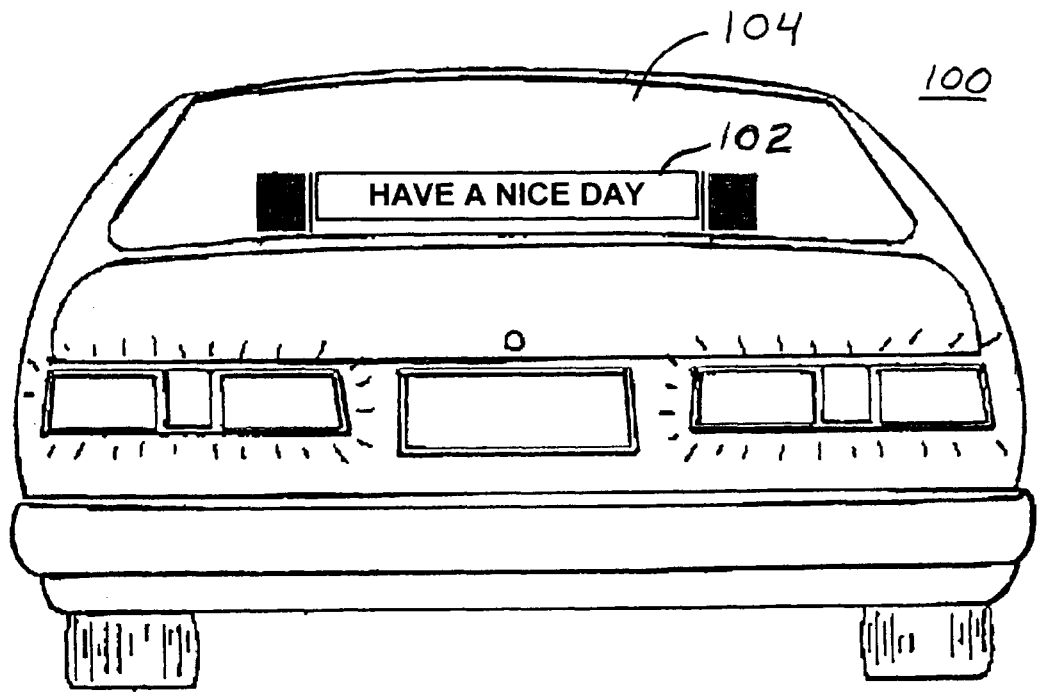
FIG. 1 illustrates the present invention with the display unit located in the rear window of a vehicle.

FIG. 1 illustrates a vehicle 100 with a Display Unit 102 in accordance with the present invention disposed inside the rear window 104 of the vehicle 100. The Display Unit 102 is shown displaying the message "HAVE A NICE DAY". It is noted that the message "HAVE A NICE DAY" is only one of a number of messages that can be selected and displayed.

Figure 2:
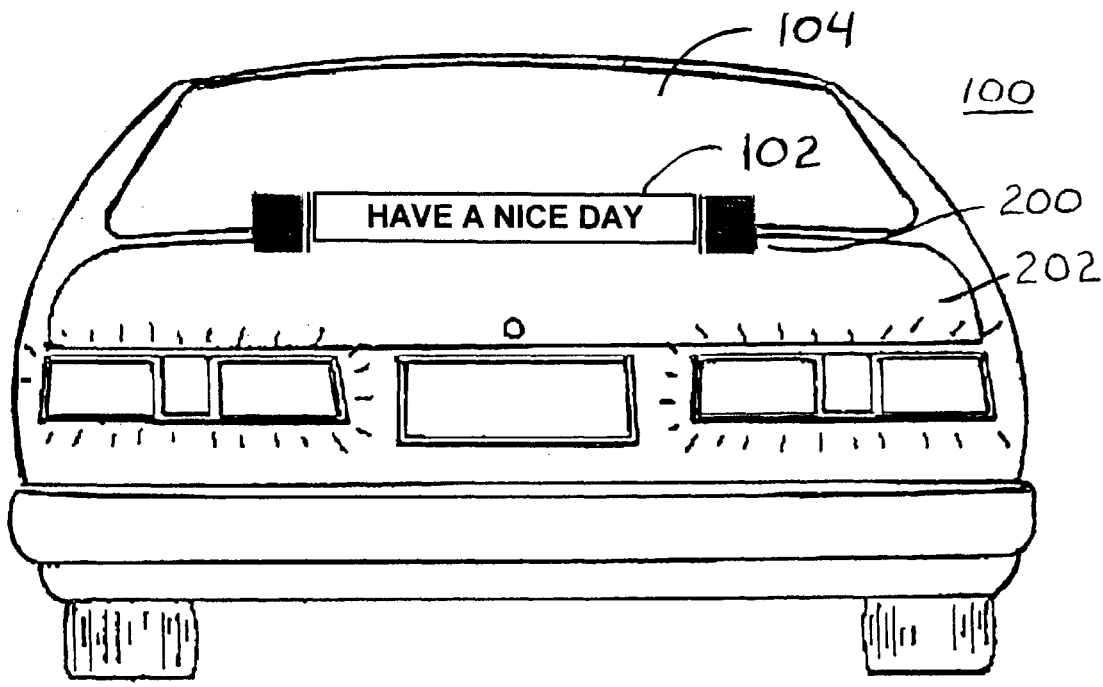
FIG. 2 illustrates the present invention with the display unit located on he top surface of the trunk lid of a vehicle.

FIG. 2 illustrates the Display Unit 100 in accordance with the present invention disposed outside the rear window 104 of the vehicle 100. The Display Unit 100 is mounted either on a surface (not shown) of the vehicle just outside the rear window 104 or on the surface 200 of the trunk 202 of the vehicle 100.

Figure 3:
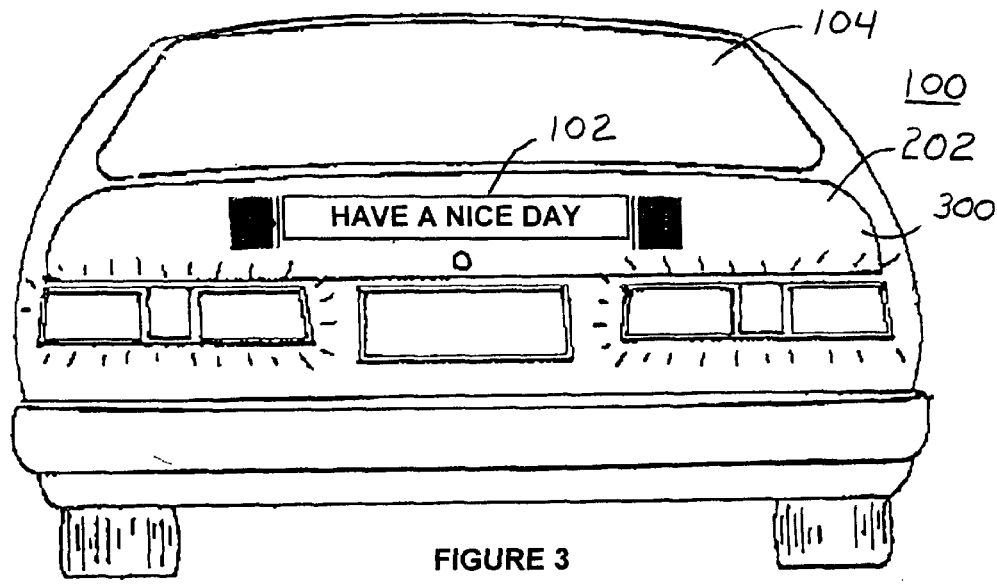
FIG. 3 illustrates the present invention with the display unit located on a ear surface of the present invention.

FIG. 3 illustrates the Display Unit 102 in accordance with the present invention mounted either on a rear surface (not shown) of the vehicle 100 or on a rear surface 300 of the vehicle trunk 202 of the vehicle 100. It should be understood that the Display Unit 102 can be mounted on the roof of a vehicle facing either forward or rearward, on side panels of the vehicle or on the front of the vehicle with the message displayed forward of the vehicle.

Figure 4:
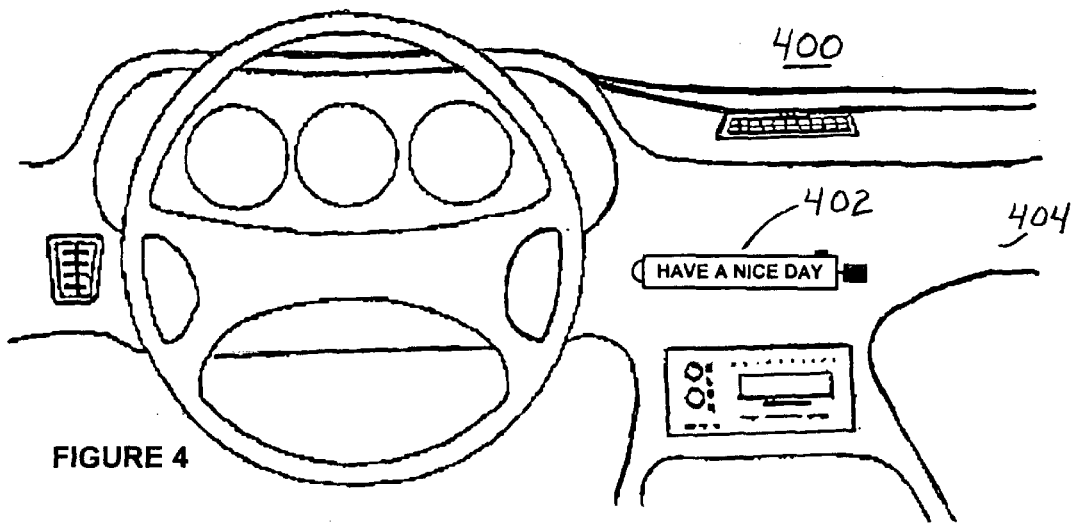
FIG. 4 illustrates the present invention with the remote control unit located on the dashboard of a vehicle.

FIG. 4 illustrates the interior 400 of the vehicle with the Remote Control Unit 402 mounted on the dashboard 404. The Remote Control Unit 402 is shown with a Driver Interface Panel displaying the message "HAVE A NICE DAY." The Remote Control Unit 402 will be discussed below.

Figure 5:
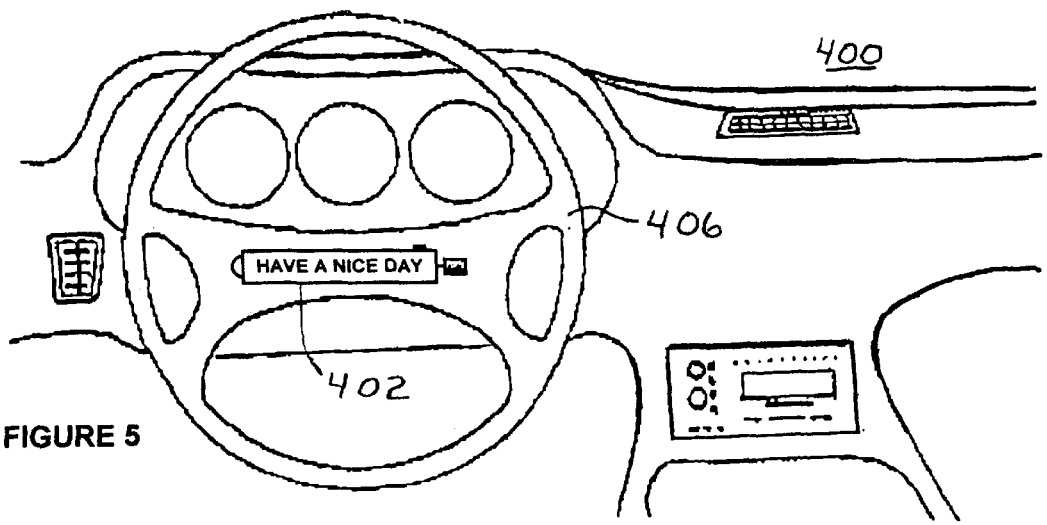
FIG. 5 illustrates the present invention with the remote control unit located on the steering wheel of a vehicle.

FIG. 5 illustrates the interior 400 of the vehicle with the Remote Control Unit 402 mounted on the steering wheel 406.

Figure 6:
FIG. 6 illustrates the remote control unit.

FIG. 6 shows the Remote Control Unit 402 having an ON/OFF switch 600, a Rotary Selector Switch 602, a Low Frequency RF Sending Unit 604, a USP programming port 605, and a Driver Interface Panel 606 displaying the message "HAVE A NICE DAY". Also contained in the Remote Control Unit 402 is a battery compartment (not shown) and a Pattern Generating Module (not shown-to be discussed below). The Pattern Generating Module includes a memory unit (not shown) to store a selected number of messages, such as "HAVE A NICE DAY", "DRIVE SAFELY", "OBSTRUCTION AHEAD", and "PASS ON THE RIGHT". The messages are stored in a table format in the memory unit. The memory unit may be a flash memory unit that can be changed (flashed) to contain alternate messages. The flash memory unit can be programmed by a computer such as a and held computer via the USB (Universal Serial Bus) programming port 605. As is well known in the art, a flash memory is easily programmed (flashed) by a computer program. The user can have a program installed on a hand held computer, for example, with a cable attached from the hand held computer to the Remote Unit 402. Alternate methods of programming the flash memory include removing the Remote Unit 402 and attaching it to a desktop computer. A further method is to have an infrared port on both the Remote Unit 402 and an infrared port on the hand held computer. The number of alternate messages depends on the size of the memory unit.

The Rotary Selector Switch 602 causes the memory unit to scroll through the selections in the table. As the Rotary Selector Switch 602 points to a message in the table, the message is displayed on the Driver Interface Panel 606. The Driver Interface Panel 606 is made up of a set of display panels such as LCD panels which, when taken together, display the messages that may be selected by a person in the vehicle. An example of a Driver Interface Panel 606 is a set of 16 or more LCD panels. The individual panels have at least a 24×24 pixel-resolution for displaying a variety of alphanumeric or other written characters or symbols. The pattern will be stored in the table in the memory unit as a complete "picture" or message in the memory, not as a string of characters or letters. It is noted that the pattern may be a character from a language other than English, such as Chinese, Japanese, Hebrew, etc.

The ON/OFF Switch 600 is a two-way sliding switch, or the equivalent, hat is used to turn the Remote Control Unit 402 ON or OFF. When turned ON, he Driver Interface Panel 606 displays the message to which the Rotary Selector witch 602 is pointed. Turning the switch to OFF will turn the Remote Control Unit 402 OFF and will also cause the Display Module 102 (FIGS. 1, 2 & 3) to shut down, if currently displaying a message. When the Remote Control Unit 402 is turned ON, the Driver Interface Panel 606 can be backlit for ten seconds or longer for night time or low light conditions by pushing down, or "clicking" the ON/OFF switch.

The Rotary Selector Switch 602 becomes active when the Remote Control Unit 402 is turned ON. Rotating the Rotary Selector Switch 602 in either direction causes the Pattern Generating Module in the Remote Control Unit 402 to sequence up or down through the pre-set display patterns stored in the table in the memory unit. The pre-set display patterns are sequentially sent to the Driver Interface Panel 606 where they are displayed. In addition, rotating the Rotary Selector Switch 602 causes the backlit feature of the Driver Interface Panel 606 to be enabled. The pattern displayed on the Driver Interface Panel 606 will blink or flash on and off to indicate that the Remote Control Unit 402 is in the selection mode, and that the flashing message is ready for selection. To choose the flashing pattern, the Rotary Selector Switch 602 is pushed inwardly, or clicked, which causes information concerning the pattern to be sent to the RF Sending Unit 604. When a pattern is selected, the Driver Interface Panel 606 will discontinue flashing and will be a steady display. The RF Sending Unit 604 sends a signal to the Display Unit 102 to cause the selected message to be displayed by the Display Unit 102.

The RF Sending Unit 604 sends a signal that turns the Display Unit 102 On or Off and sends an encoded signal that tells the Display Unit 102 which message to display.

The Pattern Generating Module includes a memory module, LCD control circuitry, selection circuitry, and RF control circuitry. Based on a sequencer pointer position set by the Rotary Selector Switch 602 the Pattern Generating Module sends the message to be displayed to the Driver Interface Panel 606 when the Rotary Selector Switch 602 is clicked. The Pattern Generating Circuitry also sends to the RF Sending Unit 604 the message identification information identifying the message to be displayed by the Display Unit 102.

The Remote Control Unit 402 is powered either by batteries held in the battery compartment or alternatively, the Remote Control Unit 404 can be powered by the vehicle battery power by providing a connection to the vehicle power supply.

Figure 7A:
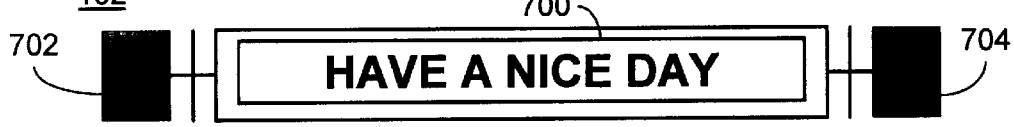
FIGS. 7A–7F illustrate various aspects of messages that can be displayed by the display unit.
Figure 7B:
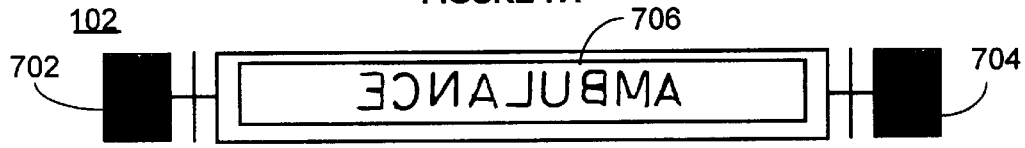
Figure 7C:
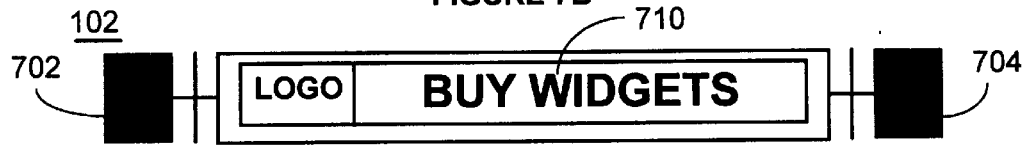
Figure 7D:
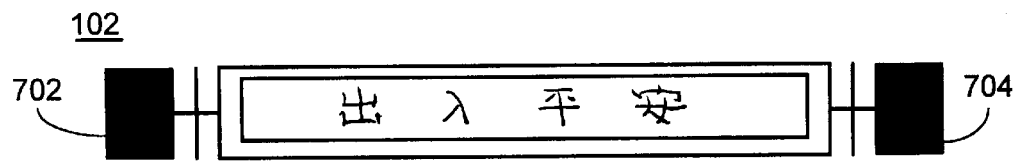
Figure 7E:
Figure 7F:
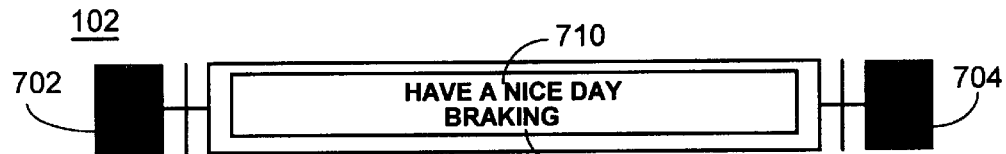

Referring to FIG. 7A there is illustrated the Display Unit 102 having an array 700 of high luminescence LED's or lights, and mounting devices 702 and 704. The mounting devices 702 and 704 may be metal brackets that can be attached by rivets or screws, or the equivalent, to a metal surface or the mounting devices 702 and 704 may be reversible lever activated suction cups or they may be magnets. It should be understood that the Display Unit 102 might be installed during the manufacture of the vehicle. The Display Unit 102 may also have a battery compartment or a connection to the vehicle's power supply. FIG. 7B shows the format of a message 706 that would be displayed if the Display Unit 102 was installed on a vehicle facing forward where the message should be readable in a rear view mirror. FIG. 7C shows a message that would include a LOGO, as indicated at 708, and a commercial message, as indicated at 710. FIG. 7D shows message in the Chinese language. FIG. 7E illustrates the message being scrolled in the direction indicated by arrow 714. The message would be scrolled if the message is longer than the width of the Display Unit 102. FIG. 7F shows the format of the Display Unit 102 divided into 2 levels, with a first level 710 on a top portion of the Display Unit 102 and a second level 712 on a bottom portion of the Display Unit 102.

Figure 8:
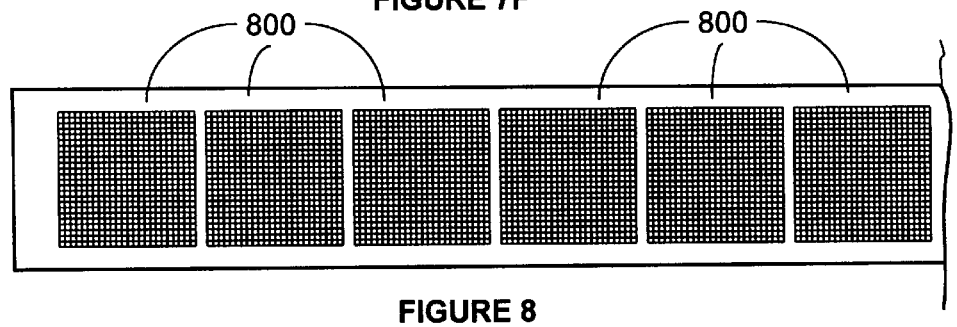
FIG. 8 illustrates 6 display unit array panels.

Referring to FIG. 8 there is illustrated 6 of the Display Unit Array Panels 800. Each panel consists of a 24×24 single character high luminescence LED's or lights, which are visible in daylight or at night. Each single character is individually controllable by the Display Unit 102. This allows the Display Unit to have the flexibility of displaying any character from any language and is able to display figures, pictures and logos. In addition, because each character is individually controllable, the display can be made to scroll and can be made to display white characters on a dark background or alternatively dark characters on a white background. Preferably, the Display Unit 102 has 16 of the Display Unit Array Panels 800. As can be appreciated, having 16 Display Unit Array Panels 800 allows a 16-character non-scrolled message to be displayed. Also, as can be appreciated if a longer message is to be displayed, more panels can be added to the Display Unit 102 or the message can be made to scroll. The limit on the size of the fixed message would be the width of the space available to mount the display unit and the power available to power the display unit.

Figure 9:
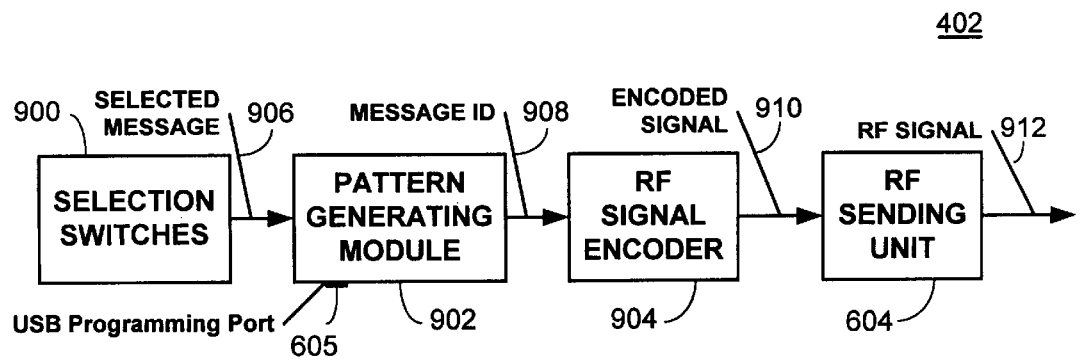
FIG. 9 is a block diagram of the remote control unit.

Referring to FIG. 9 there is shown a block diagram of the Remote Control Unit 402. The Remote Control Unit 402 includes Selection Switches 900 the Rotary Selector Switch 602 and the ON/OFF switch 600 (FIG. 6)), Pattern Generating Module 902, RF Signal Encoder 904, and the RF Sending Unit 604. As discussed above, the driver selects a message to be displayed by manipulating the Selection Switches 900. Information concerning the selected message is communicated to the Pattern Generating Module 902 as indicated at 906, which generates message identification information that is communicated to the RF Signal Encoder 904 as indicated at 908. The RF Signal Encoder 904 encodes the message identification information and communicates the encoded signal to the RF Sending Unit 604 as indicated at 910. The RF Sending Unit 604 transmits the RF encoded signal, as indicated at 912. The RF Sending Unit 604 is a one way communicating device, which sends a signal to turn the Display Unit 102 ON or OFF and to send the encoded signal that identifies which message the Display Unit 102 is to display. The Pattern Generating Module 902 includes memory, LCD control circuitry, message selection circuitry, and RF control circuitry. Based on a sequencer pointer position that is controlled by the Rotary Selector Switch 602 the indicated message is sent to the Driver Interface Panel 606 (FIG. 6) when the Rotary Selector Switch 602 is clicked. The USB Programming Port 605 is connected to Pattern Generating Module 902.

Figure 10:
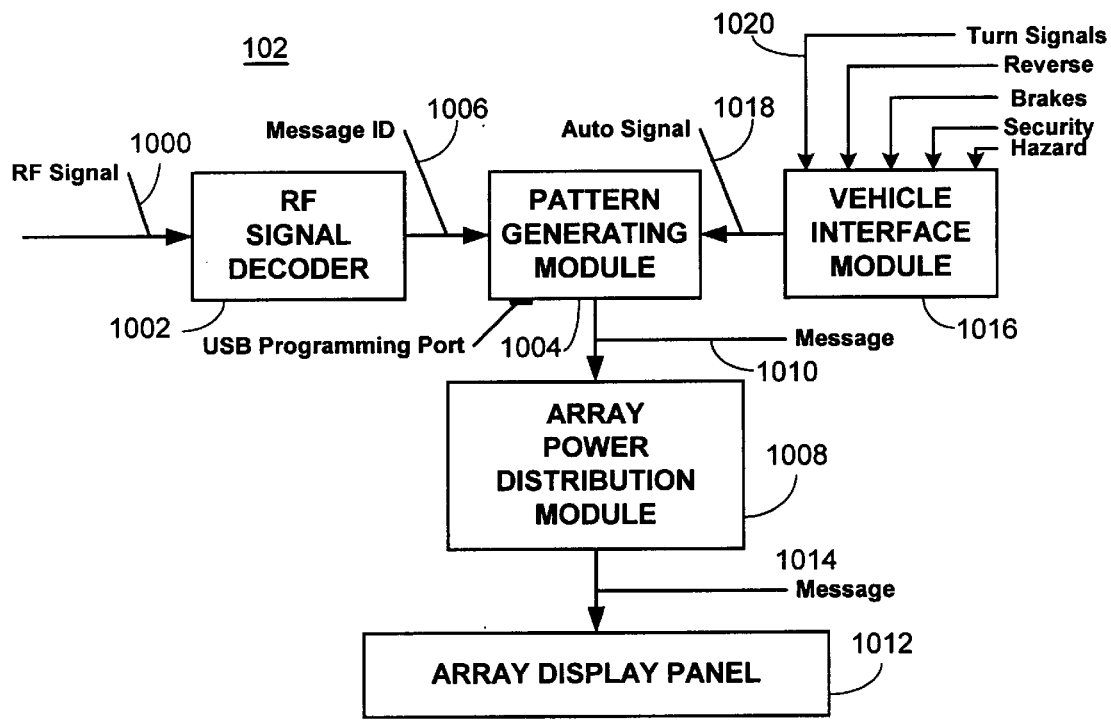
FIGURE 10 is a block diagram of the display unit.

Referring to FIG. 10, a block diagram of the Display Unit 102 is shown. As indicated at 1000, the RF Signal sent by the RF Sending Unit 604 in the Remote Control Unit 402 (FIG. 9) is received and communicated to the RF Signal Decoder 1002. The RF Signal Decoder 1002 decodes the encoded RF signal to determine which message has been selected and communicates the selected message information to the Pattern Generating Module 1004, as indicated at 1006. The Pattern Generating Module 1004 is essentially the same as the Pattern Generating Module 902 in the Remote Control Unit 402. The Pattern Generating Module 1004, upon receiving the Message ID, as indicated at 1006, looks up the message indicated by the Message ID by sequentially accessing pre-set memory locations in a memory device, such as a Flash memory device. The Flash memory device in the Pattern Generating Module 1004 is programmed to be the same as the memory unit in the Pattern Generating Module 902 in the Remote Control Unit 402. The Pattern Generating Module 1004 generates the proper output for displaying the selected message by converting the flash memory output to ON or OFF signals for individual display panel lights, and communicates the ON/OFF signals to the Array Power Distribution Module 1008 as indicated at 1010. The Array Power Distribution Module 1008 amplifies the signal from the Pattern Generating Module 1004 sufficiently to power the high luminescence LEDs or lights on the Array Display Panel 1012. The high luminescence LEDs or lights are necessary so that the message displayed by the Display Unit 102 will be visible in outside light as well as in darkness. The signals amplified by the Array Power Distribution Module 1008 are sent to the Array Display Panel 1012, as indicated at 1014. The Array Display Panel 1014 has sixteen 24×24 pixel panels arranged to form a display panel.

The Pattern Generating Module 1004 also has input from the Vehicle Interface Module 1016, as indicated at 1018. The Vehicle Interface Module 1016 has input ports, indicated at 1020, connectable to selected signals generated by the vehicle, including a signal from the braking system, the turn signals, the vehicle-in-reverse signals, the vehicle security system and the hazard signals. In addition, the Vehicle Interface Module 1016 has a 12 VDC input voltage port for powering the Display Unit 102. The Auto Interface Module 1016 overrides any signal input to the Pattern Generating Module 1008 from the Remote Control Unit 402 and causes specialized messages to be sent to the Display Unit 102 when the automotive functions occurs. Each input from the Auto Interface Module 1016 is assigned a priority so that in the event two signals are input to the Vehicle Interface Module 1016, the signal with the higher priority will be forwarded to the Pattern Generating Module 1004. In addition, each input from the Remote Control Unit 402 is assigned a priority so that the Pattern Generating Module 1004 will display the input with the highest priority whether the input is from the Vehicle Interface Module 1016 or from the Remote Control Unit 402. When the signal from the vehicle discontinues, the Pattern Generating Module 1004 causes the Display Unit 104 to resume the previous display message or if the previous display message is no longer indicated, the Pattern Generating Module 1004 turns the Display Unit 104 OFF.

If the Display Unit 104 is mounted on the front of the vehicle, the Pattern Generating Module 1004 has the capability to reverse the character pattern so that a driver in a vehicle in front of the vehicle with the Display Unit 104 can read the message when looking into a rear view mirror. When the Display Unit 104 is mounted on the front of the vehicle, the inputs from the Vehicle Interface Module 1016 do not override the signals from the Remote Control Unit 402. As discussed above, the flash memory unit in the Display Unit 102 is the same as the flash memory unit in the Remote Control Unit 402. The flash memory units in the Display Unit 102 and the Remote Control Unit 402 are programmable via USB Programming Ports connected to the respective Pattern Generating Modules 902 and 1004. Alternatively, the flash memory unit in the Remote Control Unit 402 can be programmed via the USB Programming Port 605 by a computer program provided by the vendor of the Remote Control Unit 402. The user can reprogram the flash memory in the Remote Control Unit 402 and the Remoter Control Unit 402 can, in turn, program the flash memory in the Display Unit 402 via the RF sending unit 604 in the Remote Control Unit 402 and the RF Signal Decoder 1002 in the Display Unit 102. The programming of the flash memory in the Display Unit 402 could be set to be done automatically. One method would be to have the flash memory units communicate each time the units are turned on to ensure that the flash memories in both the Remote Control Unit 402 and the Display Unit 102 are identical, and if not, to change the flash memory in the Display Unit 102 to be the same as the flash memory in the Remote Control Unit 402.

The foregoing description of the embodiments of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vehicle driver-alert communication system disposed in a vehicle, comprising:

a driver controllable remote control unit installed in a vehicle, wherein the driver controllable remote control unit includes an on/off switch, a first table of preselected and programmed signals, a rotary switch controllable by a person in the vehicle, wherein the person in the vehicle can sequentially select the signals in the first table, a remote control display to allow the person in the vehicle to visually view each signal from the first table as the rotary switch selects each signal, a first communication module to communicate an identification code for a selected signal to the display unit, a toggle switch associated with the rotary switch to send the identification code for the selected signal to the first communication module, a radio frequency signal encoder and wherein the first communication module includes a radio frequency transmitter to transmit an encoded radio frequency signal to the display unit;

a vehicle interface module having input signals from signaling systems in the vehicle wherein each input signal is assigned a unique priority;

a display unit installed on the vehicle for displaying a signal, wherein the display unit includes a second communication module to receive the identification code from the remote control unit, a second table of preselected and programmed signals that is identical to the first table, a pattern generating module having an input from the second communication module to receive the identification code from the remote control unit and an input from the vehicle interface module, an array power distribution module and an array display panel that displays the signal having the highest priority.

2. The system of claim 1 wherein the input signals from the signaling system in the vehicle includes an input from a braking signal system, an input form a hazard warning signal system, an input form a turning signal system, an input from the vehicle security system and an input from a signal system indicating the vehicle is in reverse gear.

3. The system of claim 2 wherein the second communication module to receive the identification code from the remote control unit comprises a radio frequency signal receiver and a radio frequency signal decoder.

4. The system of claim 3 wherein the pattern generating module determines which signal is to be displayed by the array display panel and communicates which signal is to be displayed to the array power distribution module.

5. The system of claim 4 wherein the pattern generating module displays the signal as indicated and received from the remote control unit when there is no signal from the vehicle interface module.

6. The system of claim 5 wherein the pattern generating module will override the signal as indicated and received from the remote control unit when there is an input received from the vehicle interface module having a higher priority and communicates the signal as indicated and received from the vehicle interface module to the array power distribution module.

7. The system of claim 5 wherein the pattern generating module will override the signal as indicated and received from the remote control unit when there is more than one signal input from the vehicle interface module and communicates the signal indicated by the vehicle interface module having a higher priority input from the vehicle interface module to the array power distribution module.

8. The system of claim 7 wherein the remote control unit further comprises a programming port and the second table of preselected and programmed signals is stored in a first flash memory wherein the first flash memory is programmable via the programming port.

9. The system of claim 8 wherein the first flash memory is programmable via the programming port by a computer.

10. The system of claim 9 wherein the second table of preselected and programmed signals in the display unit is stored in a second flash memory located in the pattern generating module in the display unit, wherein the second flash memory in the pattern generating module in the display unit is programmable.

11. The system of claim 10 wherein the second flash memory in the pattern generating module in the display unit is programmed via a radio frequency signal received from the remote unit.

12. The system of claim 10 wherein the second flash memory in the pattern generating module in the display unit is programmed via a programming port located on the pattern generating module in the display unit.

* * * * *